United States Patent
Denoix et al.

(10) Patent No.: US 10,605,071 B2
(45) Date of Patent: Mar. 31, 2020

(54) ENCAPSULATED SENSORS AND ELECTRONICS

(71) Applicant: Schlumberger Technology Corporation, Sugar Land, TX (US)

(72) Inventors: Henri Denoix, Clamart (FR); Pierre Mouget, Clamart (FR); Roel Van Os, Clamart (FR); Viet Tung Nguyen, Clamart (FR); Dennis Pittman, Clamart (FR); Xiang Sun, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 635 days.

(21) Appl. No.: 15/333,563

(22) Filed: Oct. 25, 2016

(65) Prior Publication Data

US 2017/0138172 A1    May 18, 2017

(30) Foreign Application Priority Data

Nov. 17, 2015  (EP) .................................... 15290289

(51) Int. Cl.
| | |
|---|---|
| *E21B 47/11* | (2012.01) |
| *E21B 47/01* | (2012.01) |
| *E21B 47/00* | (2012.01) |
| *G01V 11/00* | (2006.01) |
| *G01V 3/20* | (2006.01) |
| *E21B 49/00* | (2006.01) |
| *E21B 49/08* | (2006.01) |

(52) U.S. Cl.
CPC ............ *E21B 47/011* (2013.01); *E21B 47/00* (2013.01); *G01V 3/20* (2013.01); *G01V 11/00* (2013.01); *G01V 11/002* (2013.01); *E21B 49/00* (2013.01); *E21B 49/08* (2013.01)

(58) Field of Classification Search
CPC ......... G01V 11/00; G01V 11/02; E21B 47/00; E21B 49/00
See application file for complete search history.

(56) References Cited

U.S. PATENT DOCUMENTS

| | | | | |
|---|---|---|---|---|
| 4,228,633 | A * | 10/1980 | Corbic | .................... B29C 49/24 53/412 |
| 4,575,681 | A | 3/1986 | Grosso et al. | |
| 6,300,762 | B1 * | 10/2001 | Thomas, Jr. | .......... E21B 47/011 324/338 |

(Continued)

FOREIGN PATENT DOCUMENTS

| | | |
|---|---|---|
| EP | 1903181 B1 | 3/2008 |
| WO | WO2004010092 A2 | 1/2004 |
| WO | 2010036244 A1 | 4/2010 |

OTHER PUBLICATIONS

The partial European search report issued in the related EP Application 15290289.6, dated May 10, 2016 ( 8 pages).

(Continued)

*Primary Examiner* — Dominic E Hawkins (57) ABSTRACT

An electrical assembly of a downhole tool utilized within a wellbore extending into a subterranean formation. The electrical assembly includes a housing substantially formed of thermoplastic material, an electronic device sealed within the housing, and an electrode or sensor sealingly embedded within a wall of the housing and electrically connected with the electronic device.

19 Claims, 6 Drawing Sheets

(56) References Cited

U.S. PATENT DOCUMENTS

| | | |
|---|---|---|
| 6,833,944 B2 | 12/2004 | Liu |
| 7,145,253 B1 | 12/2006 | Kim et al. |
| 7,901,247 B2 | 3/2011 | Ring |
| 8,047,328 B1 | 11/2011 | Milewicz et al. |
| 2005/0116718 A1* | 6/2005 | Chen ........................ G01V 3/28 |
| | | 324/338 |
| 2009/0139322 A1* | 6/2009 | Montaron ................ E21B 29/10 |
| | | 73/152.51 |
| 2012/0137764 A1* | 6/2012 | Lawrence ............. E21B 49/005 |
| | | 73/152.23 |
| 2013/0126164 A1* | 5/2013 | Sweatman ............ E21B 21/003 |
| | | 166/282 |
| 2013/0235537 A1 | 9/2013 | Swett et al. |
| 2013/0293234 A1* | 11/2013 | Bloemenkamp ......... G01V 3/24 |
| | | 324/355 |
| 2014/0231069 A1* | 8/2014 | VanLue ................. E21B 33/128 |
| | | 166/181 |
| 2015/0000933 A1 | 1/2015 | Parry et al. |
| 2015/0068738 A1* | 3/2015 | Wayne ................ E21B 33/1243 |
| | | 166/250.11 |
| 2016/0138948 A1* | 5/2016 | Cordill .................. E21B 47/011 |
| | | 73/152.54 |

OTHER PUBLICATIONS

The extended European search report issued in the related EP Application 15290289.6, dated Sep. 1, 2016 (12 pages).

\* cited by examiner

ENCAPSULATED SENSORS AND ELECTRONICS

CROSS-REFERENCE TO RELATED APPLICATIONS

The present invention claims the benefits of European Patent Application No. 15290289.6, filed on Nov. 17, 2015, titled "Encapsulated Sensors and Electronics," the entire content of which is hereby incorporated by reference into the current application.

BACKGROUND OF THE DISCLOSURE

Wells are generally drilled into a land surface or ocean bed to recover natural deposits of oil, gas, and other natural resources that are trapped in geological formations in the Earth's crust. Testing and evaluation of completed and partially finished wellbores have become commonplace, such as to increase well production and return on investment. Information about the subsurface formations, such as measurements of the formation pressure, formation permeability, and recovery of formation fluid samples, may be utilized for predicting the economic value, the production capacity, and the production lifetime of a subsurface formation.

Various downhole tools and/or sensors may be utilized to perform such formation evaluations. For example, a resistivity tool may be utilized to measure the electrical resistivity of a formation surrounding the wellbore, because porous formations having high resistivity generally indicate the presence of hydrocarbons, while porous formations having low resistivity are generally water saturated. Resistivity tools utilize electrodes that are urged against a sidewall of the wellbore, or that are disposed at a distance ("standoff") from the sidewall, and that emit and receive electrical energy through the formation to measure electrical current and/or potential to determine the formation resistivity.

Formation evaluation and other downhole tools and operations have become increasingly complex and expensive as wellbores are drilled deeper and through more difficult materials. Such wellbores present increasingly harsher environments, where temperature may exceed 250 degrees Celsius and pressure may exceed 30,000 pounds per square inch (PSI). Such extremes can damage the electrical connectors, sensors, and other electronic components of the downhole tools, and can cause downhole fluids to leak into the electronic components, and/or otherwise compromise the accuracy and even operation of the downhole tools.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes an electrical assembly of a downhole tool operable within a wellbore extending into a subterranean formation. The electrical assembly includes a housing substantially formed of thermoplastic material, an electronic device sealed within the housing, and an electrode or sensor sealingly embedded within a wall of the housing and electrically connected with the electronic device.

The present disclosure also introduces an apparatus that includes an electrical assembly of a downhole tool operable within a wellbore extending into a subterranean formation. The electrical assembly includes a thermoplastic housing, an electronic device sealed within the thermoplastic housing, and a sensor sealingly embedded within a wall of the thermoplastic housing. The sensor may be or comprise a metal electrode sealingly embedded within the wall of the thermoplastic housing. A surface of the metal electrode may be exposed to an environment external to the thermoplastic housing such that the metal electrode forms at least a portion of an electrically conductive path between the external environment and the electronic device.

The present disclosure also introduces a method that includes constructing an electrical assembly of a downhole tool operable within a wellbore extending into a subterranean formation. Such construction includes inserting an electrical conductor or component into a bore extending though a wall of a thermoplastic housing, and transmitting energy through the electrical conductor or component to melt a portion of the wall in contact with the electrical conductor or component such that the melted portion conforms to the electrical conductor or component to sealingly embed the electrical conductor or component within the wall upon solidification of the melted portion. The method also includes assembling the electrical assembly in the downhole tool.

The present disclosure also introduces an apparatus that includes an electrical assembly of a downhole tool operable within a wellbore extending into a subterranean formation. The electrical assembly includes a housing having a first housing portion, substantially formed of a first thermoplastic material having a first electrical conductivity, and a second housing portion, sealingly embedded within the first housing portion and substantially formed of a second thermoplastic material having a second electrical conductivity. The second electrical conductivity is substantially greater than the first electrical conductivity. The electrical assembly also includes an electronic device disposed within the housing and electrically connected with the second housing portion, as well as an electrode embedded within the first housing portion and electrically connected with the second housing portion. A surface of the electrode may be exposed to an environment external to the housing.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 1:
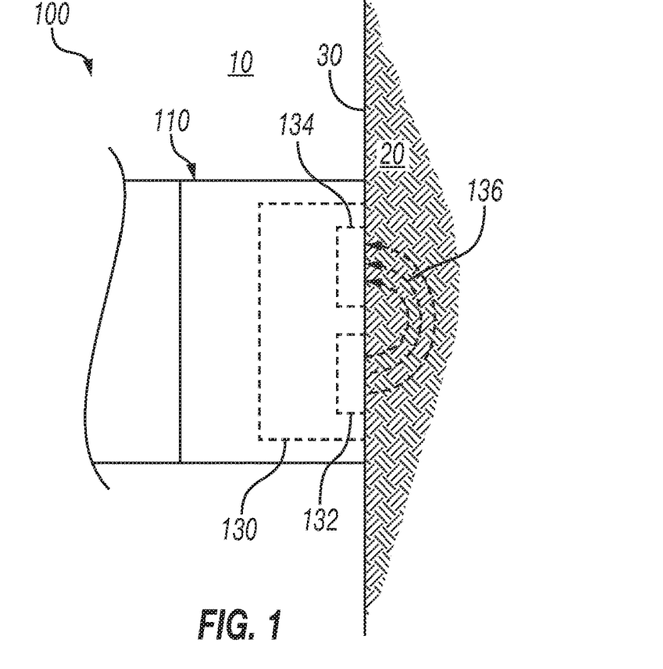
FIG. 1 is a schematic view of at least a portion of an example implementation of an apparatus according to one or more aspects of the present disclosure.

FIG. 1 is a schematic view of a portion of an example downhole imaging system 100 that may be employed onshore and/or offshore according to one or more aspects of the present disclosure, representing an example environment in which one or more aspects described below may be implemented. The imaging system 100 comprises a downhole tool 110 that may be conveyed within a wellbore 10 formed in one or more subterranean formations 20.

The downhole tool 110 may be deployed into the wellbore 10 via a conveyance means (not shown), which may be or comprise a wireline cable, a slickline cable, coiled tubing, or drill pipe. However, other means for conveying the downhole tool 110 within the wellbore 10 are also within the scope of the present disclosure.

The downhole tool 110 may be or comprise an acoustic tool, a density tool, a directional drilling tool, a drilling tool, an EM tool, a formation evaluation tool, a gravity tool, a logging while drilling (LWD) tool, a magnetic resonance tool, a measurement while drilling (MWD) tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tough logging condition (TLC) tool, although other downhole tools are also within the scope of the present disclosure. For example, the example implementation of the downhole tool 110 depicted in FIG. 1 is a resistivity tool operable to emit, receive, and/or monitor electrical current via one or more resistivity or other sensors 130.

As the downhole tool 110 operates, measurement data and/or information generated by the sensor 130 and/or other components of the downhole tool 110 may be sent to logging, control, and/or other surface equipment (not shown) disposed at a wellsite surface from which the wellbore 10 extends. Such information may also or instead be stored in the downhole tool 110 for subsequent recall and/or processing after the downhole tool 110 is retrieved to the wellsite surface. For example, the downhole tool 110 may be operable to output information related to formation resistivity for evaluating the formation 20 and/or fluids located within the formation 20.

The sensor 130 comprises one or more electrodes 132, 134, which may also be referred to in the art as button electrodes or buttons. The electrodes 132, 134 may be disposed within the downhole tool 110 for contacting a sidewall 30 of the wellbore 10 to create an electric circuit through the formation 20. For example, the electrode 132 may emit electrical current 136 that flows through the formation 20 and is received by the electrode 134. The sensor 130 may measure the current 136, and such measurements may be utilized to evaluate the formation 20 and/or the fluids therein. Although the electric current is shown being emitted by the electrode 132 and received by the electrode 134, it is to be understood that implementations of the sensor 130 may utilize both electrodes 132, 134 to emit an electric current while another sensor or portion of the downhole tool 110 may receive the electric current emitted by the two electrodes 132, 134. Such sensors may be utilized, for example, in low-frequency resistivity measurement applications. Furthermore, although the electrodes 132, 134 are shown contacting the sidewall 30, the downhole tool 110 may be utilized in the wellbore 10 such that the sensor 130 and the electrodes 132, 134 are disposed at a distance or "standoff" from the sidewall 30. The standoff region may be filled with wellbore fluid, which may become part of the path of the electrical current 136 or another signal, and may be taken into account during measurement operations. The standoff may be utilized, for example, if the downhole tool 110 does not include a pushing system. Also, under certain conditions, a standoff may protect the sensor 130 from wear and impacts, and/or improve the measurements.

Figure 2:
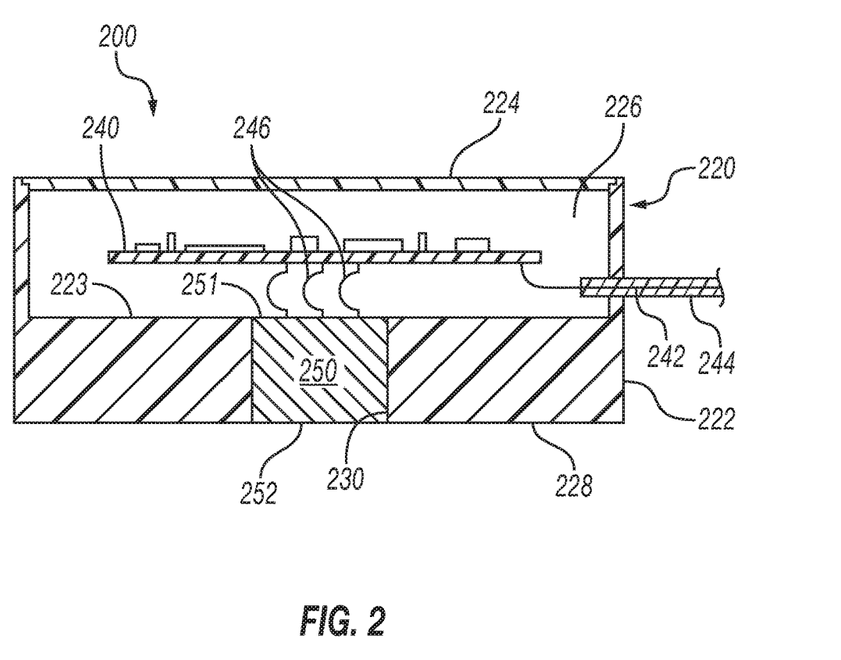
FIG. 2 is a schematic view of a portion of an example implementation of the apparatus shown in FIG. 1 according to one or more aspects of the present disclosure.

FIG. 2 is a schematic sectional view of an example implementation of the sensor 130 shown in FIG. 1, designated in FIG. 2 by reference numeral 200, according to one or more aspects of the present disclosure. The following description refers to FIGS. 1 and 2, collectively.

The sensor 200 comprises a housing 220 having a frame 222 and a cover 224. The housing 220 may substantially be formed of a thermoplastic material, such as a polyether-ether-ketone (PEEK) polymer and/or other electrically insulating thermoplastic materials. The frame 222 and the cover 224 define an internal volume 226 containing various components of the sensor 200, including an electronic circuit board 240. The circuit board 240 comprises various electronic components facilitating the emission, reception, and/or monitoring of electrical current via a metal electrode 250. The circuit board 240 may also comprise various electronic components facilitating the communication of data and/or power with other portions of the downhole tool 110 and/or the surface equipment.

The internal volume 226 may be filled with gel, oil, and/or other filler materials that surround the circuit board 240 and otherwise reduce or eliminate voids within the internal volume 226. Such voids, if not filled, induce stress within the sensor 200 due, for example, to pressure differentials that would exist between the voids and wellbore pressure when the sensor 200 is deployed within the wellbore. The filler material may be solid at wellsite surface temperatures but liquid at downhole temperatures, although other filler materials are also within the scope of the present disclosure.

The cover 224 is sealingly connected with the frame 222 to sealingly enclose the circuit board 240 within the housing 220. The sealingly connected arrangement between the frame 222 and the cover 224 prevents the passage of wellbore fluid between the frame 222 and the cover 224 into the internal volume 226. The frame 222 and the cover 224 may be sealingly connected via energy transmitted into or through the cover 224 to melt a portion of the cover 224 and/or the frame 222, thus welding and sealing the frame 222 and the cover 224 together upon solidification of the melted portion(s). For example, the frame 222 and the cover 224 may be sealingly connected via one or more aspects described below.

The sensor 200 also comprises an electrical conductor 242 electrically connected to the circuit board 240 and/or other electrical component(s) within the internal volume 226. The electrical conductor 242 extends from the internal volume 226 through the housing 220 for connection with another component of the downhole tool 110. At least the portion of the electrical conductor 242 that extends from the housing 220 is insulated within a sheath 244. The sheath 244 may extend at least partially into the internal volume 226, or the illustrated end of the sheath 244 may be substantially flush with an internal or external surface of the housing 220. The sheath 244 may substantially be formed of PEEK and/or other thermoplastic materials that may be molded or otherwise formed around the electrical conductor 242, although perhaps a thermoplastic material other than that utilized to form the housing 220.

The metal electrode 250 may be a substantially cylindrical member substantially formed of INCONEL, MONEL, steel, copper, and/or other electrically conductive metals. The metal electrode 250 is sealingly retained within a correspondingly shaped bore 230 formed in the frame 222. The circuit board 240 is electrically connected with the metal electrode 250 via one or more electrical conductors 246. The electrical conductors 246 may comprise flexible electrical conductors, including cables, wires, and/or metal mesh.

The metal electrode 250 includes an internal surface 251 for connection with the circuit board 240 via the electrical conductors 246, and an external surface 252 for contacting the sidewall 30 of the wellbore 10. In the example implementation depicted in FIG. 2, the internal surface 251 of the metal electrode 250 is substantially flush with an internal surface 223 of the frame 222, and the external surface 252 of the metal electrode 250 is substantially flush with an external surface 228 of the frame 222, although other implementations are also within the scope of the present disclosure. However, the external surface 252 of the metal electrode 250 is disposed relative to the external surface 228 of the frame 222 in a manner permitting the metal electrode 250 to contact the sidewall 30 of the wellbore 10 or be disposed at a distance from the sidewall 30 and thereby form a portion of an electrically conductive path between the circuit board 240 and the environment external to the sensor 200, such as the formation 20 and perhaps wellbore fluid in the region of the standoff. Because the sensor 200 comprises a single electrode 250, the sensor 200 may either emit or receive the electric current or other signals, while another sensor or portion of the downhole tool 110 may receive the electric current from the sensor 130 or emit the electric current to the sensor 130.

The sealingly embedded arrangement of the metal electrode 250 within the bore 230 prevents the passage of wellbore fluid, and/or other fluids of the environment external to the sensor 200, between the metal electrode 250 and the frame 222. The metal electrode 250 may be sealingly embedded within the frame 222 via energy transmitted into or through the metal electrode 250 to melt a portion of the frame 222 contacting the metal electrode 250, such that the melted portion of the frame 222 conforms to and seals around the metal electrode 250 upon solidification of the melted portion. For example, the metal electrode 250 may be sealingly embedded within the frame 222 via one or more aspects described below.

Figure 3:
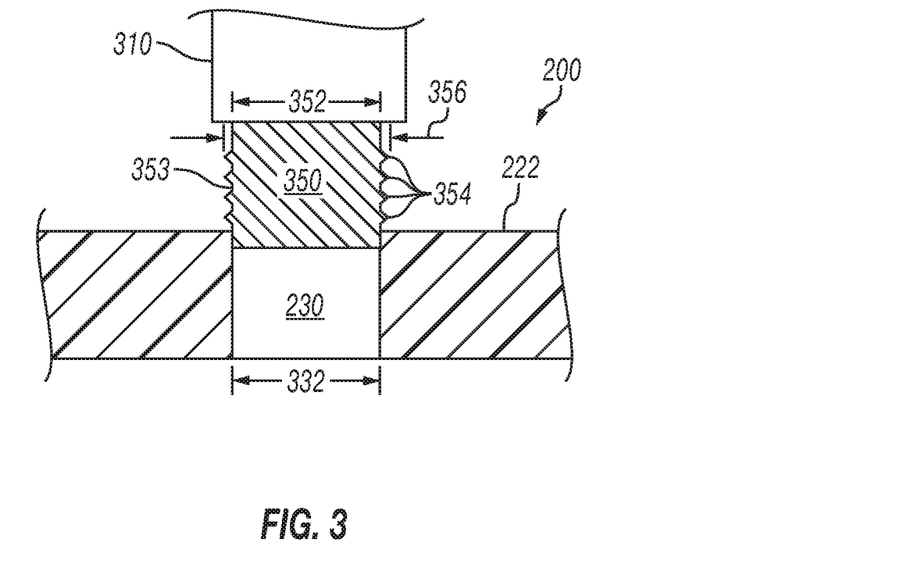
FIGS. 3 and 4 are schematic views of a portion of another example implementation of the apparatus shown in FIG. 2 at different stages of assembly.
Figure 4:
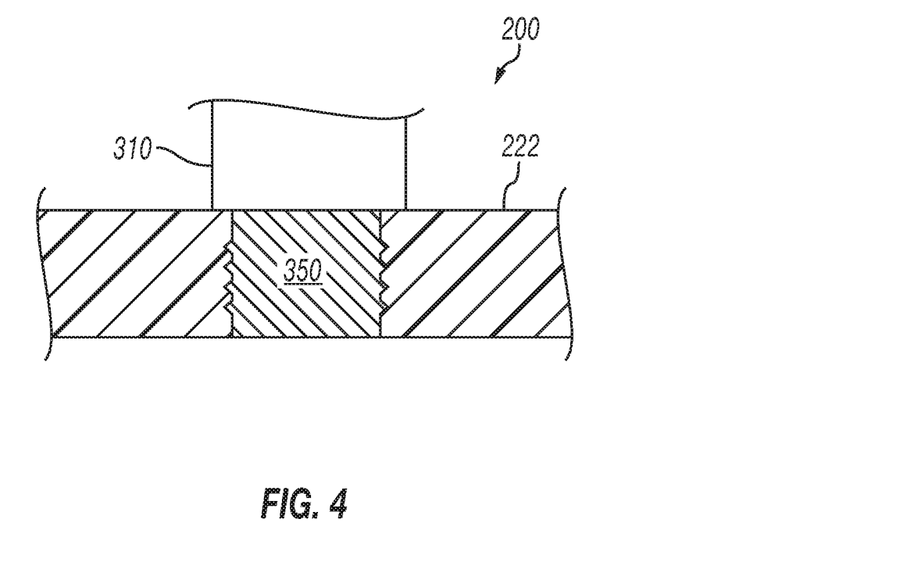

FIGS. 3 and 4 are schematic sectional views of a portion of an example implementation of the sensor 200 shown in FIG. 2, designated in FIGS. 3 and 4 by reference numeral 300, according to one or more aspects of the present disclosure. The sensor 300 comprises the housing frame 222 described above, as well as an example implementation of the metal electrode 250 that is designated in FIGS. 3 and 4 by reference numeral 350. FIG. 3 depicts the metal electrode 350 being inserted into the bore 230 of the frame 222, and FIG. 4 depicts the metal electrode 350 after being sealingly embedded within the frame 222.

The metal electrode 350 comprises a plurality of ribs 354 each protruding radially outward from the otherwise substantially cylindrical surface 353 of the metal electrode 350. Each rib 354 circumferentially extends continuously around the surface 353 of the metal electrode 350, and is longitudinally spaced apart from and noncontiguous with each of the other ribs 354. The cross-sectional profile of each rib 354 may be substantially triangular, as shown in FIGS. 3 and 4, or otherwise shaped (such as the substantially rectangular cross-sectional profile of the ribs 658 shown in FIG. 8).

Each rib 354 may have an outer diameter 356 that differs from the outer diameter 352 of the surface 353 of the metal electrode 350 by an amount ranging between about one percent and about ten percent. The outer diameter 352 of the surface 353 of the metal electrode 350 may range between about three millimeters (mm) and about ten mm, and each rib 354 may have an outer diameter that is larger than the outer diameter 352 of the surface 353 of the metal electrode 350 by an amount that ranges between about 0.1 mm and about 0.5 mm. However, other values are also within the scope of the present disclosure. In implementations in which the metal electrode 350 is a return electrode, the outer diameter 352 may be substantially larger than ten mm.

The surface 353 of the metal electrode 350 may also be knurled, whether instead of or in addition to the existence of the ribs 354. The ribs 354, knurling, and/or other external features of the metal electrode 350, including those described below and others that are also deemed to be within the scope of the present disclosure, may aid in provider greater sealing between the metal electrode 350 and the frame 222, such as by creating additional surface area to which the frame 222 may conform as a result of the welding process described below. Similarly to the ribs 354, the knurling and/or the other external features of the metal electrode 350 may extend continuously around the surface 353 of the metal electrode 350. However, the ribs 354, the knurling, and/or the other external features may also be discrete or distinct features distributed about the surface 353 of the metal electrode 350 in a random or predetermined pattern, including implementations comprising ribs 354 and/or other external features that do not extend continuously around the surface 353.

FIG. 3 further shows a portion of an ultrasonic emitter 310, which may be referred in the art as a sonotrode or an ultrasonic horn, disposed in contact with the metal electrode 350. The ultrasonic emitter 310 may generate or transmit high frequency ultrasonic energy or vibrations into the metal electrode 350 as the ultrasonic emitter 310 pushes the metal electrode 350 into the bore 230. The ultrasonic energy produces friction forces and, thus, heat at locations of contact between the metal electrode 350 and the frame 222, thereby melting portions of the frame 222 that contact the metal electrode 350. The melted portions of the frame 222 conform to the outer profile of the metal electrode 350, including the ribs 354, knurling, and/or other external features. As shown in FIG. 4, after the ultrasonic emitter 310 fully inserts the metal electrode 350 into the bore 230, the ultrasonic emitter 310 may be turned off, or simply removed from contact with the metal electrode 350. The melted portions of the frame 222 will then re-solidify in conformity around the metal electrode 350, thus securing the metal electrode 350 within the frame 222 and forming a seal between the metal electrode 350 and the frame 222.

Instead of or in addition to the ultrasonic emitter 310, a heat source or heat emitter (not shown) may be disposed in contact with the metal electrode 350 to transfer heat into the metal electrode 350 and, thus, increase the temperature of the metal electrode 350 prior to and/or during insertion of the metal electrode 350 into the bore 230. The increased temperature of the metal electrode 350 may aid in melting portions of the frame 222 that are in contact with the metal electrode 350.

Prior to the embedding process described above, an inner diameter 332 of the bore 230 and the outer diameter 352 of the surface 353 of the metal electrode 350 may differ by less than about one percent, which may aid in obtaining the intended sealing embedded arrangement. However, other relative dimensions are also within the scope of the present disclosure.

Figure 5:
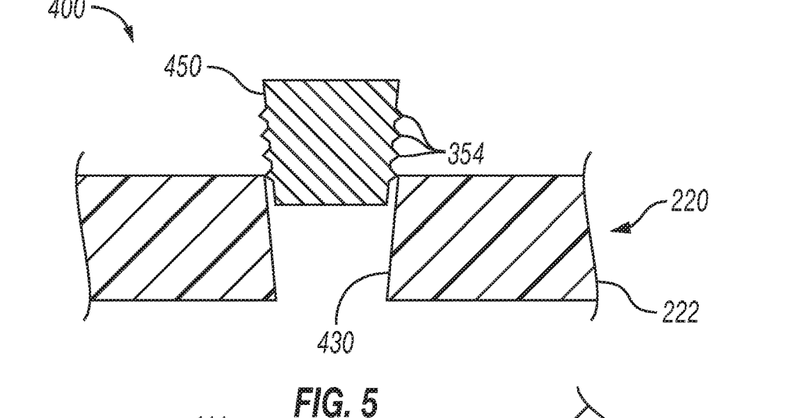
FIGS. 5 and 6 are schematic views of a portion of another example implementation of the apparatus shown in FIG. 2 at different stages of assembly.
Figure 6:
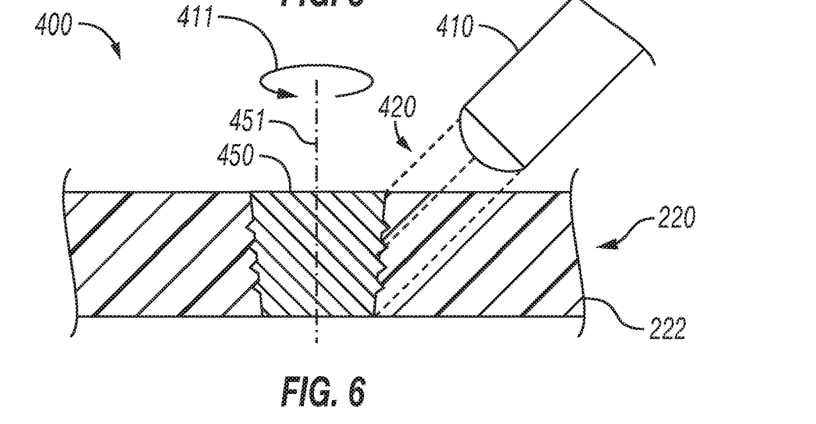

FIGS. 5 and 6 are schematic sectional views of a portion of another example implementation of the sensor 200 shown in FIG. 2, designated in FIGS. 5 and 6 by reference numeral 400, according to one or more aspects of the present disclosure. The sensor 400 comprises the housing frame 222 described above, as well as another example implementation of the metal electrode 250 that is designated in FIGS. 5 and 6 by reference numeral 450. FIG. 5 depicts the metal electrode 450 being inserted into a bore 430 of the frame 222, and FIG. 6 depicts the metal electrode 450 after being sealingly embedded within the frame 222.

In the example implementation depicted in FIGS. 5 and 6, the metal electrode 450 has a substantially conical frustum or otherwise tapered shape, and the bore 430 has a corresponding conical frustum or otherwise tapered shape. The metal electrode 450 and the bore 430 are otherwise substantially similar to the metal electrode 350 and the bore 230, respectively, shown in FIGS. 3 and 4. For example, the metal electrode 450 may comprise ribs 354, knurling, and/or other external features that may aid in obtaining the sealingly embedded arrangement described herein. Similarly, the metal electrode 450 may be installed in the bore 430 utilizing ultrasonic energy, such as via utilization of the emitter 310 shown in FIGS. 3 and 4.

However, focused light energy may be utilized instead of or in addition to ultrasonic energy. For example, in the example implementation depicted in FIG. 5, a laser emitter 410 is located proximate the interface between the metal electrode 450 and the frame 222 so as to direct laser energy to regions of contact between the metal electrode 450 and the frame 222. The laser emitter 410 may be operated to transmit laser energy 420 onto the outer surface of the metal electrode 450 after the metal electrode 450 is inserted into the bore 430, including rotating the laser emitter 410 around the longitudinal axis 451 of the metal electrode 450, as indicated in FIG. 6 by rotational arrow 411. The laser energy 420 creates a focused region of increased temperature to melt portions of the frame 222 that adjacent the metal electrode 450. The melted portions of the frame 222 then conform to the external profile of the metal electrode 450, including the ribs, knurling, and/or other external features of the metal electrode 450.

Because the frame 222 physically interposes the laser emitter 410 and the metal electrode 450 when the metal electrode 450 is disposed within the opening 430, at least a portion of the frame 222 may comprise a thermoplastic material that is at least partially transparent to the laser energy 420 emitted by the laser emitter 410. Thus, the laser energy 420 may pass through the frame 222 to impinge upon the metal electrode 450.

Although the electrodes 250, 350, 450 are described above as being substantially cylindrical or conical members, it is to be understood that these and other electrodes within the scope of the present disclosure may be otherwise shaped. For example, implementations of the sensors 200, 300, 400 and/or other sensors within the scope of the present disclosure may comprise electrodes having substantially rectangular or otherwise shaped cross-sections, including implementations in which the electrodes or portions of the electrodes contact fluids of the environment external to the sensors.

Figure 7:
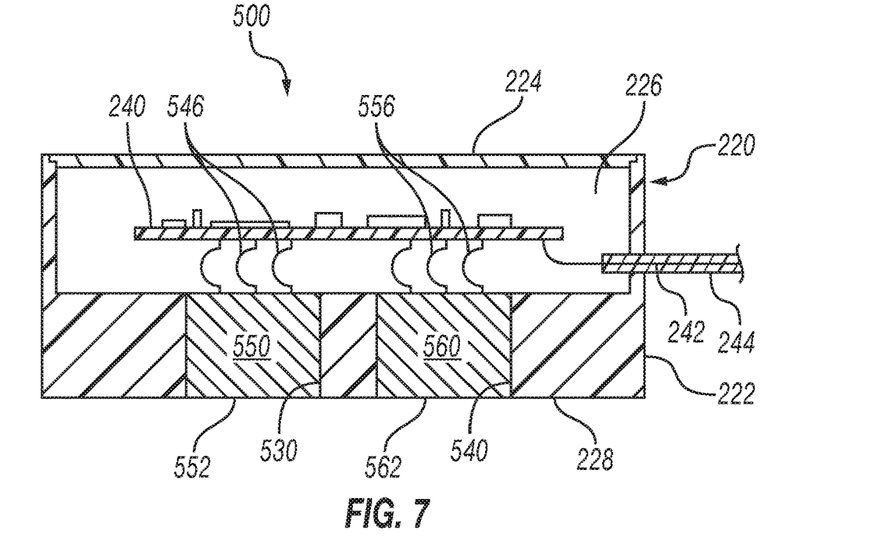
FIG. 7 is a schematic view of a portion of another example implementation of the apparatus shown in FIG. 2 according to one or more aspects of the present disclosure.

FIG. 7 is a schematic sectional view of another example implementation of the sensor 200 shown in FIG. 2 according to one or more aspects of the present disclosure, and designated in FIG. 7 by reference numeral 500. Unless described otherwise, the sensor 500 is substantially similar to the sensor 200 shown in FIG. 2, including where indicated by like reference numbers. For example, like the sensor 200 shown in FIG. 2, the sensor 500 shown in FIG. 7 comprises the thermoplastic housing 220 having the frame 222, the cover 224, and the circuit board 240 encapsulated within the internal volume 226. Similarly, the electrical conductor 242 insulated within the sheath 244 electrically connects the electronic board 240 with other portions of the downhole tool 110 and/or surface equipment.

However, while the sensor 200 shown in FIG. 2 comprises one metal electrode 250, the sensor 500 shown in FIG. 7 comprises a first metal electrode 550 and a second metal electrode 560. Accordingly, the frame 222 comprises first and second bores 530, 540 in which the first and second metal electrodes 550, 560 are sealingly embedded. The first metal electrode 550 may be operable to emit current flowing from the circuit board 240 to the formation 20, and the second metal electrode 560 may be operable to sense and/or otherwise receive electrical current returning from the formation 20. The physical characteristics and installation of each of the first and second metal electrodes 550, 560 are substantially similar or identical to the metal electrode 250 shown in FIG. 2. The circuit board 240 is electrically connected with the metal electrodes 550, 560 via one or more electrical conductors 546, 556, which are substantially similar or identical to the electrical conductors 246 shown in FIG. 2.

Figure 8:
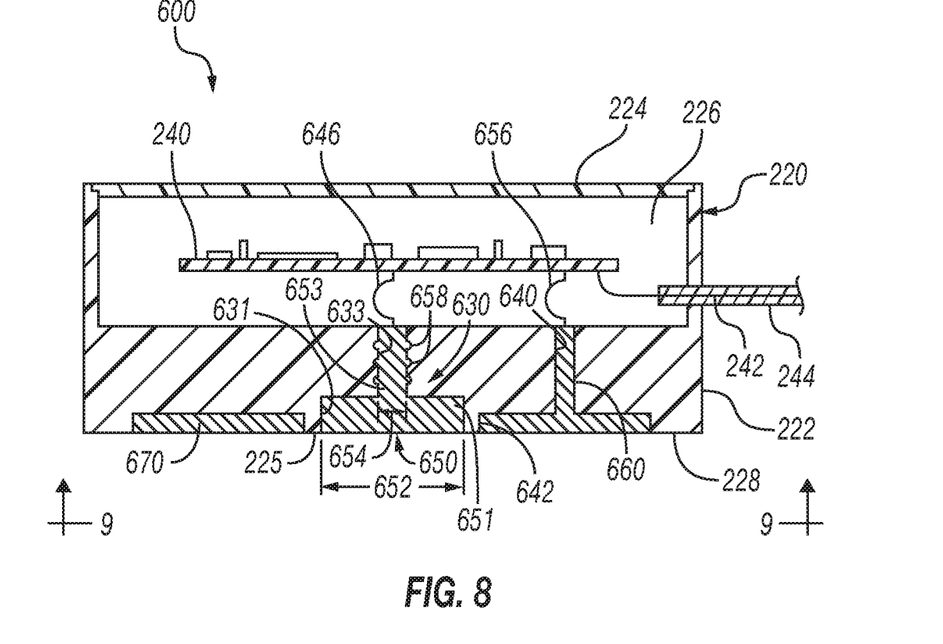
FIG. 8 is a schematic view of a portion of another example implementation of the apparatus shown in FIG. 2 according to one or more aspects of the present disclosure.

FIG. 8 is a schematic sectional view of another example implementation of the sensor 200 shown in FIG. 2 according to one or more aspects of the present disclosure, and designated in FIG. 8 by reference numeral 600. Unless described otherwise, the sensor 600 is substantially similar to the sensor 200 shown in FIG. 2, including where indicated by like reference numbers. For example, like the sensor 200 shown in FIG. 2, the sensor 600 shown in FIG. 8 comprises the thermoplastic housing 220 having the frame 222, the cover 224, and the circuit board 240 encapsulated within the internal volume 226. Similarly, the electrical conductor 242 insulated within the sheath 244 electrically connects the electronic board 240 with other portions of the downhole tool 110 and/or surface equipment.

However, the sensor 600 comprises a stepped metal electrode 650 sealingly embedded within a correspondingly stepped bore 630 extending through the frame 222. An outer portion 651 of the stepped metal electrode 650 has a first outer diameter 652, and an inner portion 653 of the stepped metal electrode 650 has a second outer diameter 654 that is substantially smaller than the first outer diameter 652. For example, the first and second diameters 652, 654 may differ by at least about 0.5 mm. The stepped bore 630 has an outer portion 631 receiving the outer portion 651 of the stepped metal electrode 650, and an inner portion 633 receiving the inner portion 653 of the stepped metal electrode 650.

The stepped metal electrode 650 is sealingly embedded within the stepped bore 630 via utilization of ultrasonic, laser, and/or thermal energy as described above. For example, the inner portion 653 of the stepped metal electrode 650 may be sealingly embedded within the inner portion 633 of the stepped bore 630, the outer portion 651 of the stepped metal electrode 650 may be sealingly embedded within the outer portion 631 of the stepped bore 630, or the inner and outer portions 653, 651 of the stepped metal electrode 650 may each be sealingly embedded within the inner and outer portions 633, 631 of the stepped bore 630, respectively.

The inner and/or outer portions 653, 651 of the stepped metal electrode 650 may comprise knurling, ribs, and/or other external features that may aid in obtaining the sealingly embedded arrangement. For example, in the example implementation depicted in FIG. 8, the inner portion 653 of the stepped metal electrode 650 comprises a plurality of ribs 658. The ribs 658 are substantially similar to the ribs 354 shown in FIGS. 3-6, except that the ribs 658 have a substantially rectangular cross-sectional profile instead of the substantially triangular cross-sectional profile of the ribs 354 shown in FIGS. 3-6. However, other cross-sectional shapes are also within the scope of the present disclosure.

The circuit board 240 of the sensor 600 is electrically connected with the stepped metal electrode 650 via one or more electrical conductors 646. The electrical conductors 646 are substantially similar or identical to the electrical conductors 246 shown in FIG. 2.

Although the sensor 600 is depicted in FIG. 8 as comprising one stepped metal electrode 650, the sensor 600 may comprise additional metal electrodes. Each additional metal electrode may be substantially similar in structure and/or installation as one or more of the metal electrodes 250, 350, 450, 550, 560, and/or 650 described above.

Figure 9:
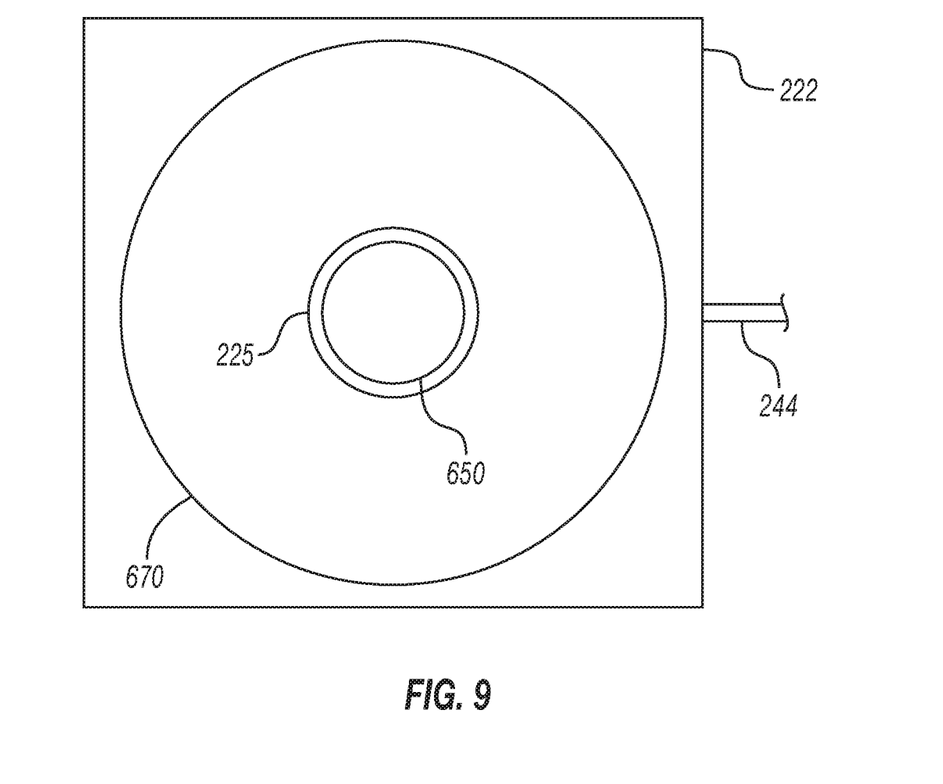
FIG. 9 is another view of the apparatus shown in FIG. 8.

The sensor 600 may also comprise a faceplate 670, which may aid in protecting the external surface 228 against erosion or other physical damage. The faceplate 670 may also or instead be an additional metal electrode for transmitting electrical current to and/or from the formation 20. The faceplate 670 may be substantially similar in structure and/or installation as one or more of the electrodes 250, 350, 450, 550, 560, and/or 650 described above, with the following possible exceptions. FIG. 9 is another view of the sensor 600 from the perspective of the corresponding view-depicting arrows in FIG. 8.

Referring to FIGS. 8 and 9, collectively, the faceplate 670 may extend substantially around the stepped metal electrode 650, and may be electrically isolated from the stepped metal electrode 650 by a substantially annular portion 225 of the frame 222. The faceplate 670 is received within a ring-shaped recess 642 extending into the external surface 228 of the frame 222. A metal conductor 660 may extend from the faceplate 670 to the internal volume 226, such as within a corresponding bore 640 extending within the frame 222 between the ring-shaped recess 642 and the internal volume 226. The metal conductor 660 may be included to form a portion of an electrical path between the faceplate 670 and the circuit board 240, such as may also include one or more electrical conductors 656 that may be substantially similar or identical to the electrical conductors 246 shown in FIG. 2.

The faceplate 670 and/or the metal conductor 660 may be sealingly embedded within the frame 222 via utilization of ultrasonic, laser, and/or thermal energy as described above. For example, the faceplate 670 may be sealingly embedded within the ring-shaped recess 642, the metal conductor 660 may be sealingly embedded within the bore 640, or the faceplate 670 and the metal conductor 660 may each be sealingly embedded within the ring-shaped recess 642 and the bore 640, respectively. The faceplate 670 and/or the metal conductor 660 may also include knurling, ribs, and/or other external features (not shown) to aid in obtaining the sealingly embedded arrangement, as described above.

Figure 10:
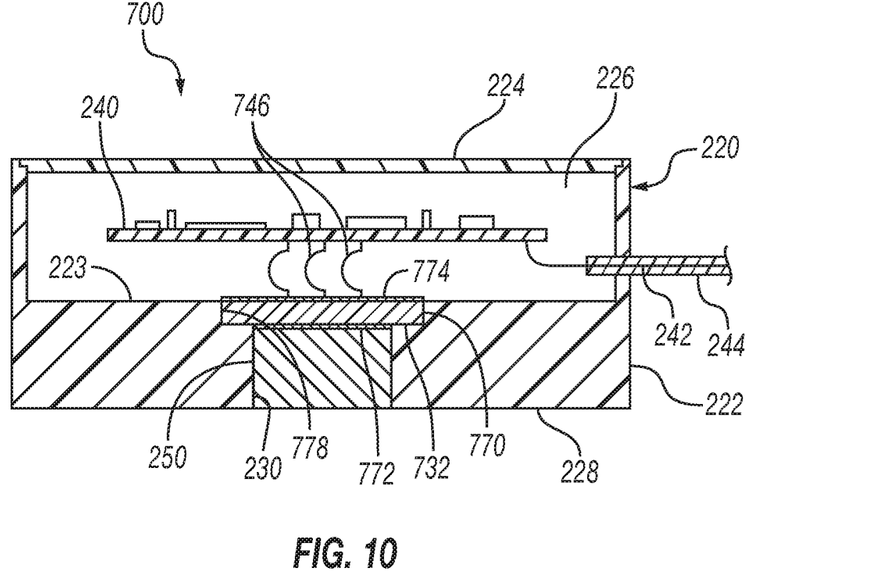
FIG. 10 is a schematic view of a portion of another example implementation of the apparatus shown in FIG. 2 according to one or more aspects of the present disclosure.

FIG. 10 is a schematic sectional view of another example implementation of the sensor 200 shown in FIG. 2 according to one or more aspects of the present disclosure, and designated in FIG. 10 by reference numeral 700. Unless described otherwise, the sensor 700 is substantially similar to the sensor 200 shown in FIG. 2, including where indicated by like reference numbers. For example, like the sensor 200 shown in FIG. 2, the sensor 700 shown in FIG. 10 comprises the thermoplastic housing 220 having the frame 222, the cover 224, and the circuit board 240 encapsulated within the internal volume 226. Similarly, the electrical conductor 242 insulated within the sheath 244 electrically connects the electronic board 240 with other portions of the downhole tool 110 and/or surface equipment.

However, in the example implementation depicted in FIG. 10, the frame 222 comprises an electrically conductive portion 770 forming a portion of the internal surface 223 of the internal volume 226. The electrically conductive portion 770 is sealingly embedded within a correspondingly shaped recess 778 extending into the internal surface 223 of the frame 222, such as via utilization of ultrasonic, laser, and/or thermal energy as described above. The electrically conductive portion 770 of the frame 222, and thus the recess 778, may be substantially cylindrical, rectilinear, and/or otherwise shaped. The electrically conductive portion 770 may substantially comprise an electrically conductive thermoplastic material, such as a PEEK matrix comprising a dispersion of metallic nanoscale features, while the remainder of the frame 222 comprises thermoplastic material that is not electrically conductive, such as PEEK without the metallic nanoscale features. For example, the electrically conductive portion 770 may have a volume resistivity of less than about 1,000 ohm-centimeters, while the remainder of the frame 222 may have a volume resistivity of more than about 1,000 ohm-centimeters.

The diameter or other outer profile of the recess 778 may be substantially larger than the diameter of the metal electrode 250, such that a flange portion 732 of the electrically conductive portion 770 may extend radially beyond the outer diameter of the metal electrode 250. The metal electrode 250 is mechanically and electrically coupled to the electrically conductive portion 770 within the bore 230, whether via direct contact or an intermediate conductive member 772 interposing the metal electrode 750 and the electrically conductive portion 770. For example, the intermediate conductive member 772 may be a metallization layer formed along at least a portion of the surface of the electrically conductive portion 770, such as may comprise gold, silver, copper, tungsten, and alloys thereof.

The circuit board 240 is electrically connected with the metal electrode 250 via the electrically conductive portion 770 and one or more electrical conductors 746 extending between the circuit board 240 and the electrically conductive portion 770. The electrical conductors 746 may be substantially similar or identical to the electrical conductors 246 shown in FIG. 2. An upper surface of the electrically conductive portion 770 may also comprise a metallization layer 774, such as may aid in establishing electrical connection between the electrical conductors 746 and the electrically conductive portion 770. The metallization layers 772, 774 may each have a thickness less than about one millimeter, and may be formed via chemical vapor deposition (CVD) and/or other means.

The sealingly embedded arrangement between the electrically conductive portion 770 and the frame 222 may be obtained by coupling the metal electrode 250 and the electrically conductive portion 770, then inserting this subassembly into the frame 222, and then welding the electrically conductive portion 770 to the frame 222. Coupling the metal electrode 250 and the electrically conductive portion 770 may be achieved by contacting the metal electrode 250 to the metallization layer 772 of the electrically conductive portion 770 and then applying and removing ultrasonic, laser, and/or thermal energy such that a portion of the metallization layer 772 melts and then solidifies in sealing contact with the metal electrode 250. However, mechanical fasteners, electrically conductive adhesive, and/or other means may also or instead be utilized to couple the metal electrode 250 and the electrically conductive portion 770. The subassembly of the metal electrode 250 and the electrically conductive portion 770 is then inserted into the frame 222, by inserting the metal electrode 250 into the bore 230 and then rotating the subassembly about the longitudinal axis of the metal electrode 250 until the electrically conductive portion 770 aligns with and is inserted into the recess 778. The flange portion 732 of the electrically conductive portion 770 is then sealingly embedded with the frame 222 utilizing the ultrasonic, laser, and/or thermal energy techniques described above. Thus, while the metal electrode 250 may not be sealed directly against the bore 230 of the frame 222, the sealingly embedded arrangement of the electrically conductive portion 770 within the frame 222 prevents the passage of fluid from between the metal electrode 250 and the bore 230 to the internal volume 226.

Although the sensor 700 is depicted in FIG. 10 as comprising one metal electrode 250 and one electrically conductive portion 770, the sensor 700 may comprise additional metal electrodes and/or additional electrically conductive portions 770 each coupled with one or more of the metal electrodes. Each additional metal electrode may be substantially similar in structure and/or installation as one or more of the metal electrodes 250, 350, 450, 550, 560, and/or 650 described above. One or more of the of the electrically conductive portions 770 may also be sealingly attached to the internal surface 223 of the internal volume 226 instead of within a corresponding instance of the recess 778.

While various example implementations of the sensor 130 shown in FIG. 1 have been described and shown in FIGS. 2-10, it is to be understood that each sensor 200, 400, 500, 600, 700 may be practiced within the scope of the present disclosure other than as specifically described and shown herein. It is also to be understood that various configurations and/or features of the sensors 200, 400, 500, 600, 700 described above and shown in one or more of FIGS. 2-10 may be incorporated as or in the sensor 130 of FIG. 1 alone or in combinations not described or shown herein but otherwise still within the scope of the present disclosure.

Figure 11:
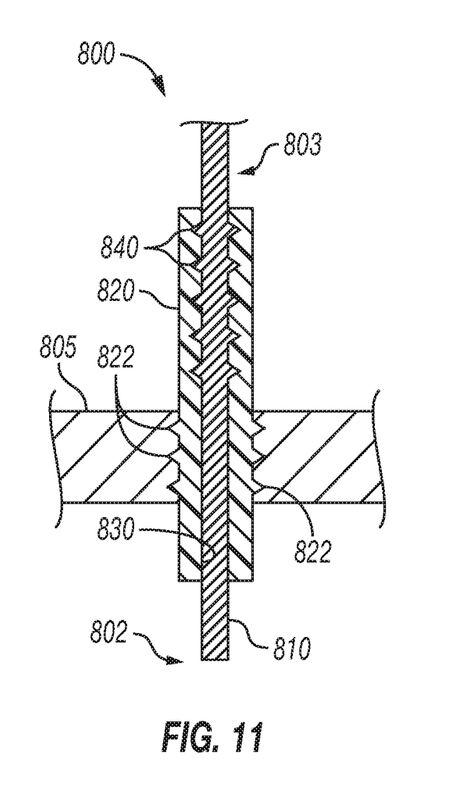
FIG. 11 is a schematic view of at least a portion of an example implementation of apparatus according to one or more aspects of the present disclosure.

FIG. 11 is a schematic sectional view of an example implementation of an electrical connector 800 that may also utilize one or more aspects described above with respect to sealingly embedding a metal object within a thermoplastic object via utilization of ultrasonic, laser, and/or thermal energy according to one or more aspects of the present disclosure. The electrical connector 800 comprises a metal conductor 810 extending axially within a thermoplastic sheath 820. The metal conductor 810 may be formed of solid metallic rod or wire stock, thus being substantially cylindrical. The metal conductor 810 is sealingly embedded within a substantially cylindrical bore 830 extending axially through the thermoplastic sheath 820. The metal conductor 810 may also comprise knurling, ribs, and/or other external features 840 that may aid in sealingly embedding the metal conductor 810 within the thermoplastic sheath 820 in the manner described above. In the example implementation depicted in FIG. 11, such features 840 comprise a plurality of ribs protruding radially outward from the otherwise substantially cylindrical external surface of the metal conductor 810, each circumferentially extending continuously around the surface of the metal conductor 810 and spaced apart from the neighboring ribs 840.

The sealingly embedded arrangement of the metal conductor 810 within the thermoplastic sheath 820 prevents the passage of fluid between the metal conductor 810 and the thermoplastic sheath 820. For example, the electrical connector 800 may be or comprise a portion of a dry/liquid bulkhead connector or other structure 805, wherein one end 802 of the electrical connector 800 may be exposed to a dry environment, while the other end 803 of the electrical connector 800 may be exposed a liquid environment, such as may contain wellbore fluids and/or other pressurized fluids. The metal conductor 810 may be sealingly embedded within the thermoplastic sheath 820 via the application of ultrasonic, laser, and/or thermal energy, as described above, to melt portions of the thermoplastic sheath 820 contacting the metal conductor 810. The melted portions of the thermoplastic sheath 820 conform to the metal conductor 810, including the external sealing features 840, and then solidify to form a fluid seal between the metal conductor 810 and the thermoplastic sheath 820. The ultrasonic, laser, and/or thermal energy may be applied to the metal conductor 810 and/or the thermoplastic sheath 820 while the metal conductor 810 is being urged into the bore 830 of the thermoplastic sheath 820, or after the metal conductor 810 is positioned within the thermoplastic sheath 820.

The material forming the structure 805 may comprise a metal or a thermoplastic material. For example, if the depicted portion of the structure 805 comprises the thermoplastic material, the thermoplastic sheath 820 may be sealingly embedded within the structure 805 via the application of ultrasonic, laser, and/or thermal energy, as described above, to melt portions of the thermoplastic sheath 920 and/or the structure 805 that are in contact. The melted portions of the thermoplastic sheath 920 and/or the structure 805 may fuse together to form a weld and, thus, a fluid seal between the structure 805 and the thermoplastic sheath 920 when the melted portions solidify. The ultrasonic, laser, and/or thermal energy may be applied to the interface of the structure 805 and/or the thermoplastic sheath 920 while the thermoplastic sheath 920 is being urged through a bore in the structure 805, or after the thermoplastic sheath 920 is positioned within the structure 805.

The example implementation depicted in FIG. 11 may also form a portion of one or more of the example implementations depicted in FIGS. 2-10. For example, the structure 805 may be a wall of the housing 220, the metal conductor 810 may be the electrical conductor 242, and the thermoplastic sheath 820 may be the thermoplastic sheath 244.

The thermoplastic sheath 820 and/or the structure 805 may also comprise knurling, ribs, and/or other features that may aid in sealingly embedding the thermoplastic sheath 820 within the structure 805 in the manner described above. In the example implementation depicted in FIG. 11, such features comprise a plurality of ribs 822 protruding radially outward from the otherwise substantially cylindrical external surface of the thermoplastic sheath 820, each circumferentially extending continuously around the surface of the thermoplastic sheath 820 and spaced apart from the neighboring ribs 822.

The sealingly embedded arrangement of the thermoplastic sheath 820 within the structure 805 prevents the passage of fluid between the thermoplastic sheath 820 and the structure 805. The thermoplastic sheath 820 may be sealingly embedded within the structure 805 via the application of ultrasonic, laser, and/or thermal energy, as described above, to melt contacting portions of the thermoplastic sheath 820 and/or the structure 805, which then solidify to form a fluid seal between the thermoplastic sheath 820 and the structure 805. The ultrasonic, laser, and/or thermal energy may be applied to the thermoplastic sheath 820 and/or the structure 805 while the connector 800 is being urged into the structure 805, or after the connector 800 is positioned within the structure 805.

Figure 12:
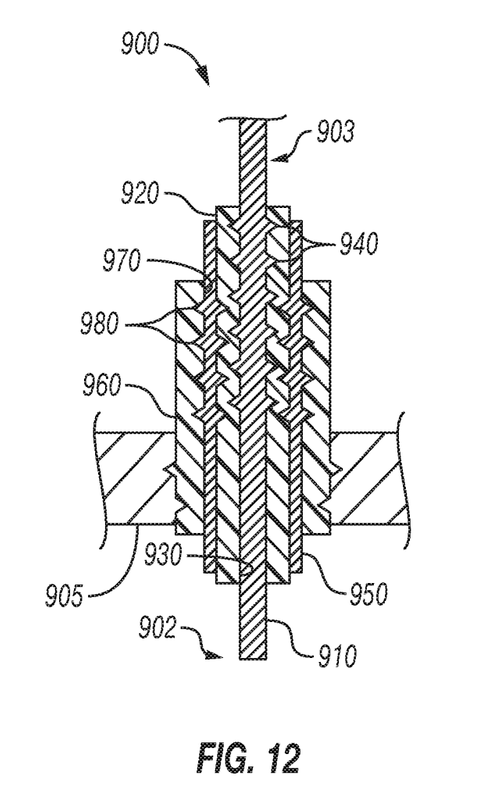
FIG. 12 is a schematic view of at least a portion of an example implementation of apparatus according to one or more aspects of the present disclosure.

FIG. 12 is a schematic sectional view of another example implementation of the electrical connector 800 shown in FIG. 11, designated in FIG. 12 by reference numeral 900. The electrical connector 900 may be substantially similar or identical to the electrical connector 800 shown in FIG. 11, except as described below.

The electrical connector 900 comprises a metal conductor 910 extending axially within a thermoplastic sheath 920. The metal conductor 910 may be formed of solid metallic rod or wire stock, thus being substantially cylindrical. The metal conductor 910 is sealingly embedded within a substantially cylindrical bore 930 extending axially through the thermoplastic sheath 920. The metal conductor 910 may also comprise knurling, ribs, and/or other external features 940 that may aid in sealingly embedding the metal conductor 910 within the thermoplastic sheath 920 in the manner described above. In the example implementation depicted in FIG. 12, such features 940 comprise a plurality of ribs protruding radially outward from the otherwise substantially cylindrical external surface of the metal conductor 910, each circumferentially extending continuously around the surface of the metal conductor 910 and longitudinally spaced apart from the neighboring ribs 940.

The sealingly embedded arrangement of the metal conductor 910 within the thermoplastic sheath 920 prevents the passage of fluid between the metal conductor 910 and the thermoplastic sheath 920. For example, the electrical connector 900 may be or comprise a portion of a dry/liquid bulkhead connector 905, wherein one end 902 of the electrical connector 900 may be exposed to a dry environment, while the other end 903 of the electrical connector 900 may be exposed a liquid environment, such as may contain wellbore fluids and/or other pressurized fluids. The metal conductor 910 may be sealingly embedded within the thermoplastic sheath 920 via the application of ultrasonic, laser, and/or thermal energy, as described above, to melt portions of the thermoplastic sheath 920 contacting the metal conductor 910. The melted portions of the thermoplastic sheath 920 conform to the metal conductor 910, including the sealing features 940, and then solidify to form a fluid seal between the metal conductor 910 and the thermoplastic sheath 920. The ultrasonic, laser, and/or thermal energy may be applied to the metal conductor 910 and/or the thermoplastic sheath 920 while the metal conductor 910 is being urged into the bore 930 of the thermoplastic sheath 920, or after the metal conductor 910 is positioned within the thermoplastic sheath 920.

The electrical connector 900 also comprises a metal tubular conductor 950 extending about the thermoplastic sheath 920 and within an additional thermoplastic sheath 960. The metal tubular conductor 990 may be formed of metallic tubular stock, braided and/or coiled wire, and/or other conductive metal means.

The metal tubular conductor 950 is sealingly embedded between the thermoplastic sheaths 920, 960 within a substantially cylindrical bore 970 extending axially through the additional thermoplastic sheath 960. The metal tubular conductor 950 may also comprise knurling, ribs, and/or other internal and/or external features 980 that may aid in sealingly embedding the metal tubular conductor 950 between the thermoplastic sheaths 920, 960 in the manner described above. In the example implementation depicted in FIG. 12, such features 980 comprise a plurality of ribs protruding radially outward and inward from the respective external and internal surfaces of the metal tubular conductor 950 that are otherwise substantially cylindrical. Each rib 980 circumferentially extends continuously around the external/internal surface of the metal tubular conductor 950, and is longitudinally spaced apart from the neighboring ribs 980.

The sealingly embedded arrangement of the metal tubular conductor 950 between the thermoplastic sheaths 920, 960 prevents the passage of fluid between the metal tubular conductor 950 and one or both of the thermoplastic sheaths 920, 960. The metal tubular conductor 950 may be sealingly embedded between the thermoplastic sheaths 920, 960 via the application of ultrasonic, laser, and/or thermal energy, as described above, to melt portions of one or both of the thermoplastic sheaths 920, 960 contacting the metal tubular conductor 950. The melted portions of the thermoplastic sheaths 920, 960 conform to the metal tubular conductor 950, including the sealing features 980, and then solidify to form a fluid seal between the metal tubular conductor 950 and one or both of the thermoplastic sheaths 920, 960. The ultrasonic, laser, and/or thermal energy may be applied to the metal tubular conductor 950 and/or one or both of the thermoplastic sheaths 920, 960 while the metal tubular conductor 950 is being urged into the bore 970 of the thermoplastic sheath 960, or after the metal tubular conductor 950 is positioned between the thermoplastic sheaths 920, 960. The ultrasonic, laser, and/or thermal energy may be utilized to sealingly embed the metal tubular conductor 950 between the thermoplastic sheaths 920, 960 and to sealingly embed the metal conductor 910 within the thermoplastic sheath 920 at the same time or in separate assembly operations.

Figure 13:
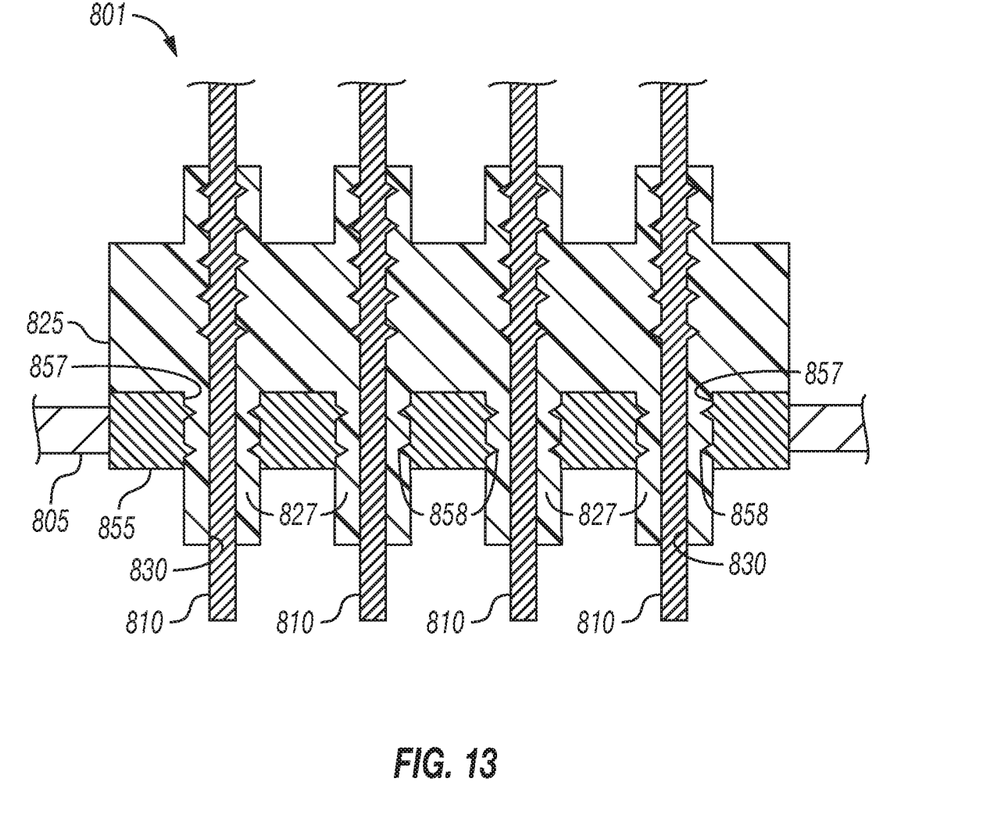
FIG. 13 is a schematic view of at least a portion of an example implementation of apparatus according to one or more aspects of the present disclosure.

FIG. 13 is a schematic sectional view of another example implementation of the electrical connector 800 shown in FIG. 11, designated in FIG. 13 by reference numeral 801. The electrical connector 801 is substantially similar or identical to the electrical connector 800 shown in FIG. 11, including where indicated by like reference numbers, except as described below.

For example, the electrical connector 801 comprises four instances of the metal conductor 810 shown in FIG. 11. Each of the metal conductors 810 is sealingly embedded within a single thermoplastic housing 825. However, other implementations within the scope of the present disclosure may include few or more than four instances of the metal conductor 810.

The thermoplastic housing 825 is substantially similar or identical to the thermoplastic sheath 820 shown in FIG. 11, except that the thermoplastic housing 825 comprises four instances of the bore 830 shown in FIG. 11, with each of the bores 830 receiving a corresponding one of the metal conductors 810. Another possible difference is that the electrical connector 801 may also comprise a metal support plate 855 at or near a portion of the thermoplastic housing 825 that is proximate the bulkhead 805. In such implementations, the metal conductors 810 extend through corresponding bores 857 that extend through the metal support plate 855. Within the bores 857, the metal conductors 810 may be electrically isolated from the metal support plate 855 by portions 827 of the thermoplastic housing 825, although other electrical isolation means may also or instead be utilized.

The metal support plate 855 may be sealingly embedded within the thermoplastic housing 825 via utilization of the ultrasonic, laser, and/or thermal energy welding techniques described above. The sealingly embedded arrangement of the metal support plate 855 within the thermoplastic housing 825 prevents the passage of fluid between the metal support plate 855 and the thermoplastic housing 825, as similarly described above. The ultrasonic, laser, and/or thermal energy may be utilized to sealingly embed the metal support plate 855 within the thermoplastic housing 825 and to sealingly embed the metal conductors 810 within the thermoplastic housing 825 at the same time or in separate assembly operations.

The metal support plate 855 may comprise knurling, ribs, and/or other sealing features 858 extending radially inward from the otherwise substantially cylindrical surface of the bores 857. For example, such sealing features 858 are depicted in the example implementation shown in FIG. 13 as ribs that may be substantially similar to those described above.

Although not shown in FIGS. 11-13, the metal conductors 810, 910 may be have conical and/or otherwise tapered portions, similar to the metal electrode 450 shown in FIGS. 5 and 6. Portions of the metal conductors 810, 910 may also have multiple diameters (i.e., be stepped, as described above), similar to the stepped metal electrode 650 shown in FIG. 8.

In view of the entirety of the present disclosure, including the figures and the claims, a person having ordinary skill in the art should readily recognize that the present disclosure introduces an apparatus comprising: an electrical assembly of a downhole tool operable within a wellbore extending into a subterranean formation, wherein the electrical assembly comprises: a thermoplastic housing; an electronic device sealed within the thermoplastic housing; and an electrical component sealingly embedded within a wall of the thermoplastic housing, wherein the electrical component is an electrode or sensor. A surface of the electrical component may be exposed to an environment external to the thermoplastic housing such that the electrical component forms at least a portion of an electrically conductive path between the external environment and the electronic device.

The sensor may be sealingly embedded within the wall via ultrasonic or laser welding, such that sealing between the electrical component and the thermoplastic housing wall is achieved without the inclusion of O-rings and/or other sealing members between the electrical component and the thermoplastic housing wall.

The electrical component may be sealingly embedded within the wall via energy transmitted through a metal portion of the electrical component to melt a portion of the wall contacting the metal portion, such that the melted portion of the wall conforms to the metal portion to form a fluid seal between the wall and the electrical component upon solidification of the melted portion. The electrical component may be substantially cylindrical and sealingly embedded within a substantially circular feature extending into an external surface of the wall. An inner diameter of the substantially circular feature and an outer diameter of the electrical component may differ by less than about one percent before the portion of the wall is melted.

The sealingly embedded arrangement of the electrical component within the wall may prevent the passage of fluid between the electrical component and the wall.

The electrical component may be or comprise a metal electrode that is substantially cylindrical and sealingly embedded within a substantially circular feature extending into an external surface of the wall. A surface of the metal electrode may be a substantially planar end of the metal electrode that is substantially flush with a portion of an external surface of the wall into which the substantially circular feature extends. The metal electrode may comprise a plurality of ribs. Each of the plurality of ribs may protrude radially outward from an otherwise substantially cylindrical surface of the metal electrode, may circumferentially extend continuously around the otherwise substantially cylindrical surface, and/or may be longitudinally spaced apart from and noncontiguous with each of the other ribs. Each of the plurality of ribs may have an outer diameter that differs from an outer diameter of the otherwise substantially cylindrical surface by an amount ranging between about one percent and about ten percent. An outer diameter of the otherwise substantially cylindrical surface may range between about three mm and about ten mm, and each of the plurality of ribs may have an outer diameter that is larger than the outer diameter of the otherwise substantially cylindrical surface by an amount that ranges between about 0.1 mm and about 0.5 mm.

At least a portion of the electrical component may form a substantially conical frustum sealingly embedded within a corresponding substantially conical frustum feature extending into an external surface of the wall. An external surface of the electrical component may be a substantially planar end of the electrical component that is substantially flush with a portion of the external surface of the wall into which the substantially conical frustum feature extends. The electrical component may comprise a plurality of ribs each protruding radially outward from an otherwise substantially conical surface of the metal electrode. Each rib may circumferentially extend continuously around the otherwise substantially conical surface. Each rib may be longitudinally spaced apart from and noncontiguous with each of the other ribs.

A first portion of the electrical component that is sealingly embedded in the wall may be substantially cylindrical, may be sealingly embedded within a first portion of a feature extending into an external surface of the wall, and may have a first diameter. A second portion of the electrical component that is also sealingly embedded in the wall may be substantially cylindrical, may be sealingly embedded within a second portion of the feature, and may have a second diameter that differs from the first diameter by at least about 0.5 millimeters. The first portion of the feature may be a cylindrical opening having the first diameter, and the second portion of the feature may be a cylindrical opening having the second diameter. An external surface of the electrical component may be a substantially planar end of one of the first and second portions of the electrical component that is substantially flush with an area of the external surface of the wall into which the feature extends.

The downhole tool may be or comprise an electrical resistivity measuring tool operable to measure resistivity of the subterranean formation.

The electronic device may comprise a circuit board encapsulated within the thermoplastic housing and in electrical connection with the electrical component. A metal electrode of the electrical component may conduct electric current between the circuit board and an environment external to the downhole tool. The electrical component may be or comprise a first metal electrode, the electrically conductive path may be a first electrically conductive path, and the electrical assembly may further comprise a second metal electrode sealingly embedded within the wall. A surface of the second metal electrode may be exposed to the external environment such that the second metal electrode forms at least a portion of a second electrically conductive path between the external environment and the electronic device. The second metal electrode may conduct electric current between the circuit board and the external environment.

The present disclosure also introduces a method comprising: constructing an electrical assembly of a downhole tool operable within a wellbore extending into a subterranean formation by: inserting an electrical conductor into a bore extending though a wall of a thermoplastic housing; and transmitting energy through the electrical conductor to melt a portion of the wall in contact with the electrical conductor such that the melted portion conforms to the electrical conductor to sealingly embed the electrical conductor within the wall upon solidification of the melted portion; and assembling the electrical assembly in the downhole tool.

Transmitting energy through the electrical conductor may comprise transmitting ultrasonic energy through the electrical conductor.

Transmitting energy through the electrical conductor may comprise transmitting ultrasonic energy through the electrical conductor via an ultrasonic energy emitter, and constructing the electrical assembly may further comprise urging the electrical conductor into the bore with the ultrasonic emitter.

The electrical conductor may comprise an external feature continuously extending circumferentially around an external surface of the electrical conductor, and the melted portion may further conform to the external feature to sealingly embed the electrical conductor within the wall upon solidification of the melted portion. The external feature may be a plurality of ribs, and each of the plurality of ribs: may protrude radially outward from an otherwise substantially cylindrical portion of the external surface; and/or may be longitudinally spaced apart from and noncontiguous with each of the other ribs.

At least a portion of the electrical conductor may be a substantially conical frustum sealingly embedded within a corresponding substantially conical frustum feature extending into an external surface of the wall. A substantially planar end of the electrical conductor may be substantially flush with a portion of the external surface of the wall into which the substantially conical frustum feature extends.

A first portion of the electrical conductor that is sealingly embedded in the wall may be substantially cylindrical, may be sealingly embedded within a first portion of a feature extending into an external surface of the wall, and may have a first diameter. A second portion of the electrical conductor that is also sealingly embedded in the wall may be substantially cylindrical, may be sealingly embedded within a second portion of the feature, and may have a second diameter that differs from the first diameter by at least about 0.5 millimeters. The first portion of the feature may be a cylindrical opening having the first diameter, and the second portion of the feature may be a cylindrical opening having the second diameter. A substantially planar end of one of the first and second portions of the electrical conductor may be substantially flush with an area of the external surface of the wall into which the feature extends.

Constructing the electrical assembly may further comprise: disposing a circuit board within a cavity of the thermoplastic housing; electrically connecting the circuit board to the electrical conductor sealingly embedded within the wall; and coupling a thermoplastic cover to the thermoplastic housing to sealingly encapsulate the circuit board. Coupling the thermoplastic cover to the thermoplastic housing may comprise transmitting energy into at least one of the thermoplastic cover and the thermoplastic housing to weld the thermoplastic cover and the thermoplastic housing together. The energy transmitted into at least one of the thermoplastic cover and the thermoplastic housing may be ultrasonic energy and/or laser energy.

The present disclosure also introduces an apparatus comprising: an electrical assembly of a downhole tool operable within a wellbore extending into a subterranean formation, wherein the electrical assembly comprises: a housing comprising: a first housing portion substantially formed of a first thermoplastic material having a first electrical conductivity; and a second housing portion sealingly embedded within the first housing portion and substantially formed of a second thermoplastic material having a second electrical conductivity, wherein the second electrical conductivity is substantially greater than the first electrical conductivity; an electronic device disposed within the housing and electrically connected with the second housing portion; and an electrode embedded within the first housing portion and electrically connected with the second housing portion. A surface of the electrode may be exposed to an environment external to the housing.

The electrode and the second housing portion may collectively form at least a portion of an electrically conductive path between the external environment and the electronic device.

The second thermoplastic material may be a PEEK material matrix comprising a dispersion of metallic nanoscale features, and the first thermoplastic material may be a PEEK material not comprising metallic nanoscale features.

The second housing portion may comprise a metallization layer to which the electrode is directly coupled. The metallization layer may comprise one or more of gold, silver, copper, tungsten, and alloys thereof. The metallization layer may have a thickness less than about one millimeter.

The second housing portion may comprise a metallization layer to which an electrical conductor is directly coupled, and the electrical conductor may be electrically connected with the electronic device. The metallization layer may comprise one or more of gold, silver, copper, tungsten, and alloys thereof. The metallization layer may have a thickness less than about one millimeter.

The first thermoplastic material may have a volume resistivity of more than about 1,000 ohm-centimeters, and the second thermoplastic material may have a volume resistivity of less than about 1,000 ohm-centimeters.

The sealingly embedded arrangement of the first and second housing portions may prevent the passage of fluid from the external environment between the first and second housing portions.

The first and second housing portions may be welded together to form the sealingly embedded arrangement thereof. The first and second housing portions may be welded together via transmission of energy into at least one of the first and second housing portions to melt a portion of at least one of the first and second housing portions, such that subsequent solidification of the melted portion sealingly welds the first and second housing portions together. The transmission of energy may comprise the transmission of ultrasonic energy and/or laser energy.

The electrode may extend through at least portion of the housing.

The electrode may comprise a plurality of ribs. Each of the plurality of ribs: may protrude radially outward from an otherwise substantially cylindrical surface of the electrode; may circumferentially extend continuously around the otherwise substantially cylindrical surface; and/or may be longitudinally spaced apart from and noncontiguous with each of the other ribs.

At least a portion of the electrode may be a substantially conical frustum sealingly embedded within a corresponding substantially conical frustum feature extending into an external surface of the housing. The electrode surface exposed to the external environment may be a substantially planar end of the electrode that is substantially flush with a portion of the external surface of the housing into which the substantially conical frustum feature extends. The electrode may comprise a plurality of ribs each protruding radially outward from an otherwise substantially conical surface of the electrode. Each rib may circumferentially extend continuously around the otherwise substantially conical surface. Each rib may be longitudinally spaced apart and noncontiguous with each of the other ribs.

A first portion of the electrode that is sealingly embedded in the housing may be substantially cylindrical, may be sealingly embedded within a first portion of a feature extending into an external surface of the housing, and may have a first diameter. A second portion of the electrode that is also sealingly embedded in the housing may be substantially cylindrical, may be sealingly embedded within a second portion of the feature, and may have a second diameter that differs from the first diameter by at least about 0.5 millimeters. The first portion of the feature may be a cylindrical opening having the first diameter, and the second portion of the feature may be a cylindrical opening having the second diameter. The electrode surface exposed to the external environment may be a substantially planar end of one of the first and second portions of the electrode that is substantially flush with an area of the external surface of the housing into which the feature extends.

The downhole tool may be or comprise an electrical resistivity measuring tool operable to measure resistance of the subterranean formation.

The electrode may be a first electrode, and the housing may further comprise a third housing portion sealingly embedded within the first housing portion and spaced apart from the second housing portion. The third housing portion may be substantially formed of the second thermoplastic material. The electrical assembly may further comprise a second electrode embedded within the first housing portion and electrically connected with the third housing portion. A surface of the second electrode may be exposed to the external environment. The electronic device may be operable to measure resistivity between the first and second electrodes along an electrical path extending through the subterranean formation between the first and second electrodes.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. An apparatus, comprising:
   an electrical assembly of a downhole tool operable within a wellbore extending into a subterranean formation, wherein the electrical assembly comprises:
   a housing substantially formed of thermoplastic material;
   a circuit board sealed within the housing; and
   an electrical component sealingly embedded within a wall of the housing so as to prevent the passage of fluid from an environment external to the housing to the circuit board, and electrically connected with the circuit board, wherein the electrical component is an electrode or a sensor, wherein a surface of the electrical component is exposed to the environment external to the housing.

2. The apparatus of claim 1 wherein the electrical component is metal electrode that forms at least a portion of an electrically conductive path between the external environment and the circuit board.

3. The apparatus of claim 1 wherein no sealing member exists between the electrical component and the wall of the housing.

4. The apparatus of claim 1 wherein a substantially planar surface of the electrical component is substantially flush with an external surface of the wall.

5. The apparatus of claim 1 wherein the electrical component comprises a plurality of ribs that each:
protrude radially outward from an otherwise substantially cylindrical surface of the electrical component;
circumferentially extend continuously around the otherwise substantially cylindrical surface; and
is longitudinally spaced apart from and noncontiguous with each of the other ribs.

6. The apparatus of claim 1 wherein:
a first portion of the electrical component that is sealingly embedded in the wall is substantially cylindrical, is sealingly embedded within a first portion of a feature extending into an external surface of the wall, and has a first diameter;
a second portion of the electrical component that is also sealingly embedded in the wall is substantially cylindrical, is sealingly embedded within a second portion of the feature, and has a second diameter that differs from the first diameter by at least about 0.5 millimeters;
the first portion of the feature is a cylindrical opening having the first diameter;
the second portion of the feature is a cylindrical opening having the second diameter; and
an external surface of the electrical component is a substantially planar end of one of the first and second portions of the electrical component that is substantially flush with an area of the external surface of the wall into which the feature extends.

7. The apparatus of claim 1 wherein the housing comprises:
a first housing portion substantially formed of a first thermoplastic material having a first electrical conductivity; and
a second housing portion sealingly embedded within the first housing portion and substantially formed of a second thermoplastic material having a second electrical conductivity, wherein:
the second electrical conductivity is substantially greater than the first electrical conductivity;
the circuit board is electrically connected with the second housing portion; and
the electrical component is embedded within the first housing portion and electrically connected with the second housing portion.

8. The apparatus of claim 7 wherein the electrical component and the second housing portion collectively form at least a portion of an electrically conductive path between the circuit board and an environment external to the housing.

9. The apparatus of claim 7 wherein the second thermoplastic material is a polyether-ether-ketone (PEEK) material matrix comprising a dispersion of metallic nanoscale features, and wherein the first thermoplastic material is a PEEK material not comprising metallic nanoscale features.

10. The apparatus of claim 7 wherein the first thermoplastic material has a volume resistivity of more than about 1,000 ohm-centimeters, and wherein the second thermoplastic material has a volume resistivity of less than about 1,000 ohm-centimeters.

11. The apparatus of claim 7 wherein:
the electrical component is a first electrode;
the housing further comprises a third housing portion sealingly embedded within the first housing portion and spaced apart from the second housing portion;
the third housing portion is substantially formed of the second thermoplastic material;
the electrical assembly further comprises a second electrode embedded within the first housing portion and electrically connected with the third housing portion; and
a surface of each of the first and second electrodes is exposed to an environment external to the housing.

12. The apparatus of claim 11 wherein the circuit board is operable to measure resistivity between the first and second electrodes along an electrical path extending through the subterranean formation between the first and second electrodes.

13. A method, comprising:
constructing an electrical assembly of a downhole tool operable within a wellbore extending into a subterranean formation by:
inserting an electrical component into a bore extending through a wall of a thermoplastic housing containing a circuit board, wherein the electrical component is exposed to an environment external to the housing; and
transmitting energy through the electrical component to melt a portion of the wall in contact with the electrical component such that the melted portion conforms to the electrical component to sealingly embed the electrical component within the wall upon solidification of the melted portion so as to prevent the passage of fluid from the environment external to the housing to the circuit board; and
assembling the electrical assembly in the downhole tool.

14. The method of claim 13 wherein transmitting energy through the electrical component comprises transmitting ultrasonic energy through the electrical component.

15. The method of claim 13 wherein transmitting energy through the electrical component comprises transmitting ultrasonic energy through the electrical component via an ultrasonic energy emitter, and wherein constructing the electrical assembly further comprises urging the electrical component into the bore with the ultrasonic emitter.

16. The method of claim 13 wherein the electrical component comprises an external feature continuously extending circumferentially around an external surface of the electrical component, and wherein the melted portion further conforms to the external feature to sealingly embed the electrical component within the wall upon solidification of the melted portion.

17. The method of claim 16 wherein the external feature is a plurality of ribs, and wherein each of the plurality of ribs:
protrudes radially outward from an otherwise substantially cylindrical portion of the external surface; and
is longitudinally spaced apart from and noncontiguous with each of the other ribs.

18. The method of claim 13 wherein constructing the electrical assembly further comprises:
disposing a circuit board within a cavity of the thermoplastic housing;
electrically connecting the circuit board to the electrical component sealingly embedded within the wall; and
coupling a thermoplastic cover to the thermoplastic housing to sealingly encapsulate the circuit board.

19. The method of claim 18 wherein coupling the thermoplastic cover to the thermoplastic housing comprises transmitting energy into at least one of the thermoplastic cover and the thermoplastic housing to weld the thermoplastic cover and the thermoplastic housing together.

* * * * *